March 8, 1927.  
A. CHRISTENSEN ET AL  
WEEDING MACHINE  
Filed Oct. 9, 1925
1,620,594
2 Sheets-Sheet 1
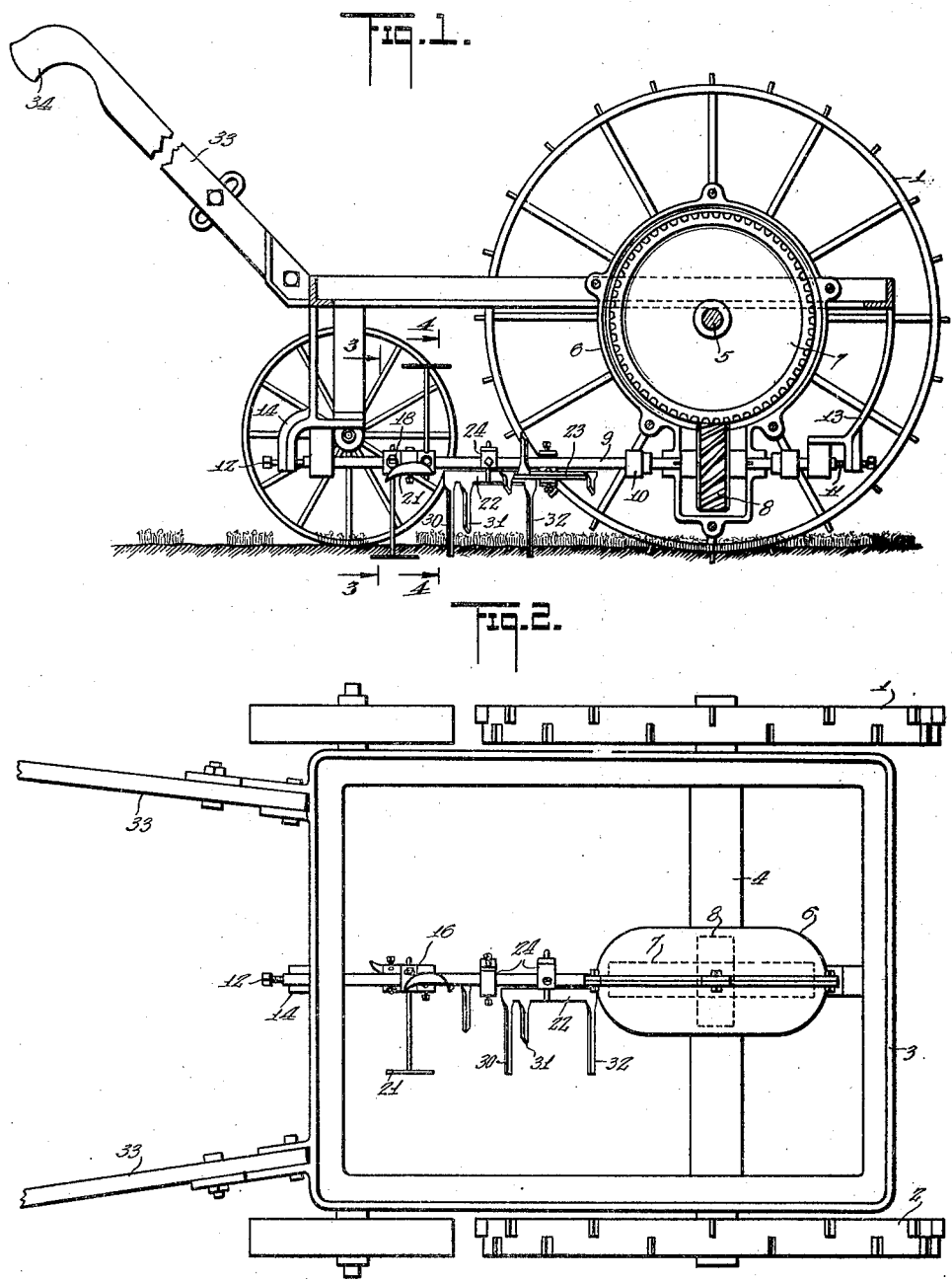
WITNESSES
INVENTOR  
A. Christensen,  
A. W. Warsen,  
BY  
ATTORNEYS March 8, 1927.
A. CHRISTENSEN ET AL
1,620,594
WEEDING MACHINE
Filed Oct. 9. 1925    2 Sheets-Sheet 2
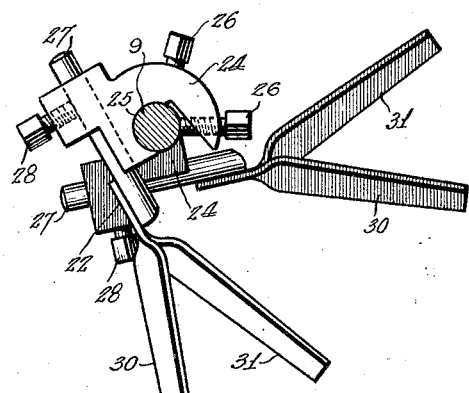
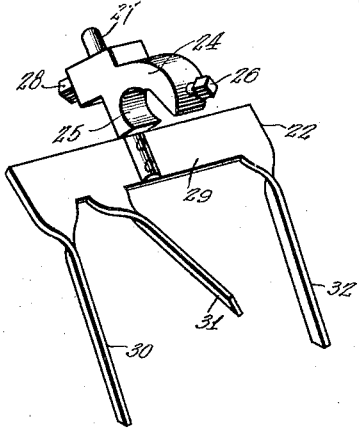
WITNESSES
INVENTOR
A. Christensen,
A. W. Warsen,
BY
ATTORNEYS Patented Mar. 8, 1927.

1,620,594

UNITED STATES PATENT OFFICE.

ANDERS CHRISTENSEN, OF WILSON, AND AUGUST WERNER WARSEN, OF HARTFORD, CONNECTICUT.

WEEDING MACHINE.

Application filed October 9, 1925. Serial No. 61,554.

This invention relates to an improved weeding machine and has for an object to provide a construction which may be readily operated either by power or manually.

A still further object of the invention is to provide a machine which is formed with a weeding structure provided with a plate having a plurality of fingers twisted to be at an angle to the plate.

In the accompanying drawings—

Figure 1 is a longitudinal vertical sectional view through a machine disclosing an embodiment of the invention.

Figure 2 is a top plan view of the machine shown in Figure 1.

Figure 3 is a fragmentary sectional view through Figure 1 on line 4—4, said view showing the weeding structure.

Figure 4 is a detail perspective view of one of the weeding elements shown in Figure 3.

Referring to the accompanying drawings by numerals, 1 and 2 indicate traction wheels and 3 a body or frame. This body or frame includes a tubular casing 4 for the shaft 5 and a divided casing 6 normally held together by suitable bolts. The casing 6 is designed to accommodate the gear wheels 7 and 8 whereby power is transmitted from the wheels 1 to shaft 5 and from thence to shaft 9 through the respective gears. A suitable clutch 10 of any desired structure is provided in shaft 9 adjacent the gear 8. In addition, adjustable screws 11 and 12 are carried by suitable brackets 13 and 14 forming part of the frame 3, said set screws acting on the respective ends of shaft 9 so that the same may be adjusted longitudinally as desired. Preferably the shaft 9 is splined in gear 8 so that it may slide therein but always turn therewith whenever clutch 10 is in engagement. Mounted on shaft 9 is a weeding structure associated with a number of thinning out members 15 which may be used with a weeding structure but do not form part of the present invention.

As illustrated in Figures 1, 3 and 4, the weeding structure is formed into two weeding sections, namely, sections 22 and 23. As these are identical, the description of one will apply to both. It is also evident that more weeding sections of the same structure could be added if desired or one of these weeding structures could be removed. The weeding structure 22 is shown in detail in Figure 4 from which it will be observed that the same is formed from a supporting or clamping block 24 having a notch 25 whereby it may be moved over the shaft 9 and clamped thereto by the set screw 26. A suitable aperture is provided in the clamping block 24, said aperture accommodating the rod 27 which is clamped in different adjusted positions by the set screw 28. The rod 27 is riveted or otherwise rigidly secured to a plate 29, which plate has a plurality of weeding arms, namely, arms 30, 31 and 32. These arms are preferably integral with plate 29, though if desired, they could be made separate and secured thereto in any desired manner. It will be noted that arm 31 is nearer arm 30 than it is arm 32. It will also be noted that arms 30 and 32 will function simultaneously while arm 31 will function a little later. The parts are arranged in this manner because the machine is continually traveling so that the space between the arms 31 and 32 is necessary as the machine travels far enough to cause arm 31 to take the ground midway between the points where arms 30 and 32 work the same. It will also be noted that the arms are flat and are twisted so as to strike the earth at an angle and thereby stir the earth and dislodge the weeds without moving the earth to one side. It will be seen that the weeding structures act to loosen up the earth without throwing the same to the side and the earth is loosened up and the roots and anything in the way of the weeding arms will be loosened or pulled out. This may dislodge some of the desired vegetables, as for instance, lettuce but is not objectionable because the lettuce or other vegetables is sown rather thickly in a row and it is desired that a little thinning out by the weeders would be advantageous.

It is to be noted that the device is preferably propelled manually and the handles 33 are grasped at the grip portion 34 and the device pushed along at any rate of speed, usually at the usual speed at which a man walks. It is understood that the device straddles a row of vegetation in such a manner that the rod 9 will be vertically over the same or nearly so. In truck gardening, it is customary to sow vegetation in rows and to sow the same close together. This is done in order to save time and labor. Later after the vegetation has appeared above the ground, a large part is removed, the practice heretofore being to remove the same by having a person pull out the undesirable part and leave the part which is to later mature. It is, of course, understood that after the weeding out machine has been used, the vegetables are cultivated to a greater or less extent according to the wishes of the particular farmer or gardener.

What we claim is:

1. In a machine of the character described, a power shaft extending in the same direction in which the machine is adapted to move when in use, a weeding structure connected with said shaft, said weeding structure including a plurality of weeding sections, each section comprising a series of weeding arms, a supporting plate for said arms, a clamping block for said plate, and means for adjustably securing said clamping block to said shaft.

2. In a machine of the character described, a power shaft and a weeding structure connected with said power shaft and operated thereby, said weeding structure including a plate, a plurality of spaced fingers, each of said fingers being flat and twisted so as to be at an angle to the plate, a rod extending from said plate, a clamping block having an aperture for accommodating said rod, a set screw for clamping said rod in place, and means carried by the block and engaging said shaft for clamping the block to the shaft.

ANDERS CHRISTENSEN.
AUGUST WERNER WARSEN.